United States Patent Office 3,005,029
Patented Oct. 17, 1961

3,005,029
NOVEL ORGANOPHOSPHORUS COMPOUNDS AND METHODS OF PREPARING SAME
Sheldon A. Buckler and Martin Epstein, Stamford, Conn., assignors to American Cyanamid Company, New York, N.Y., a corporation of Maine
No Drawing. Filed July 1, 1959, Ser. No. 824,168
14 Claims. (Cl. 260—606.5)

The present invention relates to primary and secondary organic phosphine oxides and methods of preparing same. More particularly, the instant discovery concerns compounds having the structural formula

wherein R is a member selected from the group consisting of alkyl radicals, substituted and unsubstituted, cycloalkyl radicals, substituted and unsubstituted, and aralkyl radicals, substituted and unsubstituted, and R′ is a member selected from the group consisting of H, 1-hydroxyalkyl radicals, substituted and unsubstituted, 1-hydroxycycloalkyl radicals, substituted and unsubstituted and α-hydroxyaralkyl radicals, substituted and unsubstituted.

Pursuant to the instant discovery, a ketone, such as cyclohexanone, acetophenone, 3-pentanone, or the like, is reacted with phosphine in the presence of a mineral acid. By providing about one molar equivalent of the ketone, the corresponding primary organic phosphine oxide is produced; on the other hand, when about two molar equivalents or more of ketone are present the corresponding hydroxy-substituted secondary organic phosphine oxide results.

According to a particular embodiment of the instant discovery, for example, a solution of cyclohexanone in concentrated (30 percent HCl by weight) hydrochloric acid is placed in a pressure bottle which, in turn, is in communication with a reservoir containing phosphine gas under pressure. The phosphine gas from the reservoir is admitted to the pressure bottle and the reaction carried out at 2 or 3 atmospheres, the pressure being maintained by replenishing the phosphine gas as it is consumed in the reaction.

The following equation illustrates the reaction when two or more molar equivalents of cyclohexanone are present:

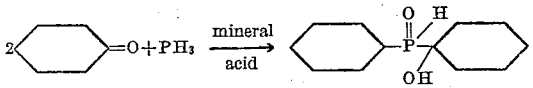

Likewise, when about one molar equivalent of cyclohexanone is present the following reaction takes place:

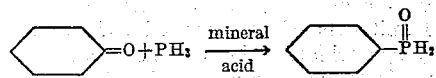

Among the many ketones contemplated herein are cyclohexanone, acetone, cyclopentanone, 3-pentanone, 4-heptanone, acetophenone, benzophenone, para-chloroacetophenone, levulinic acid (gamma-ketopentanoic acid), methyl isobutyl ketone, octyl ethyl ketone, 1-hydroxy-3-oxo-butane, 1-methoxy-3-oxo-butane, para-nitroacetophenone, and the like.

The reactions of the present invention are preferably conducted in the presence of a strong aqueous mineral acid, such as hydrochloric acid, phosphoric, nitric and sulfuric acid. Although more dilute aqueous mineral acid solutions on the order of about 10 to 30 percent by weight or less are contemplated herein, aqueous mineral acids in the concentration range of 30 to 95 percent by weight are preferred.

As indicated above, very desirable results are obtained by conducting the reactions of the present discovery at a pressure above atmospheric. Nevertheless, it is within the purview of the instant invention to conduct the reactions at pressures substantially higher or lower than 2 or 3 atmospheres. For example, good results are obtained at pressures ranging from atmospheric up to about 500 atmospheres or more. It has been shown to be practical and preferable to operate at a pressure in the range of 1–150 atmospheres. At sub-atmospheric pressures the rate of reaction gradually decreases.

Insofar as temperature conditions are concerned, very good results are obtained by bringing the reactants into intimate contact at ambient temperature (21° C.–25° C.). As in the case of the pressure conditions defined above, a wide range of temperatures, for example, from about −5° C. to about 100° C., may be employed effectively. However, temperatures in the range of about 15° C. to about 50° C. are preferred.

While the aforedescribed manner of bringing the reactants into intimate contact affords many advantages, the present discovery is not limited thereto. For instance, an alternate suitable method involves converging or impinging in a reaction zone separate streams of ketone, phosphine, and mineral acid, respectively. If desired, any two of the reaction components may be combined prior to their being brought into impinging contact, either countercurrently or tangentially, with the remaining component. Obviously, other modifications are within the purview of this invention.

By the same token, the process of the present discovery may be conducted batchwise, continuously or semi-continuously.

Among the substituents contemplated herein for R and R′ are halogen, carboxy, alkoxy, nitro, and the like.

The novel compounds produced herein are useful as complexing agents for the extraction, by conventional means, of certain metal ions. For example, uranyl values can be selectively leached from an ore containing the same by employing techniques known in the art, as shown by Blake et al. in the Atomic Energy Commission Report ORNL–1903, May 13, 1955.

For a better understanding of the instant invention, and not for the purpose of restricting it, the following examples are presented:

EXAMPLE I

*Cyclohexy-1-hydroxycyclohexylphosphine oxide and cyclohexylphosphine oxide*

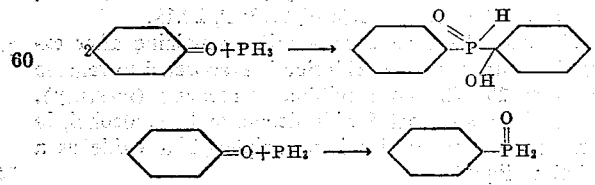

The above reactions are conducted in a 250-milliliter pressure bottle connected to and in communication with a reservoir containing phosphine gas under 4 atmospheres pressure, the pressure bottle being mounted on a shaking device. A solution of 39.3 grams (0.4 mole) of cyclohexanone in 130 milliliters of concentrated (37 percent by weight HCl) hydrochloric acid is placed in the pressure bottle. The space above this solution is evacuated and filled with nitrogen gas, evacuated and filled with nitrogen gas several more times, and finally evacuated. Phosphine gas from the reservoir is then admitted to the pressure bottle and the reaction carried out under 2-3 atmospheres of phosphine. While the reactants are brought together at ambient temperature (20° C.–25° C.), a moderate rise in temperature to about 50° C. is noted. The reaction is complete in 30 minutes. At the end of this period the space above the solution in the pressure bottle is evacuated and filled with nitrogen gas, this process being repeated several times. The resulting solution is then poured onto 300 grams of ice with stirring. A solid precipitates which is collected and dried to give 31.5 grams (which is 69 percent by weight of the amount theoretically producible) of cyclohexyl-1-hydroxycyclohexylphosphine oxide, melting point 142° C.–143° C. A purer sample is prepared by recrystallization from benzene, melting point 151° C.–152° C.

Analysis calculated for $C_{12}H_{23}O_2P$: C, 62.58; H, 10.07; P, 13.45. Found: C, 62.51; H, 10.03; P, 13.66.

The aqueous filtrate resulting after removal of solid precipitate therefrom (see above) is evaporated in vacuo to a constant weight at a temperature of about 20° C. and at a pressure of 1 millimeter (mercury) to give cyclohexylphosphine oxide in the form of a colorless liquid.

EXAMPLE II

*Isopropyl-2-hydroxyisopropylphosphine oxide and isopropylphosphine oxide*

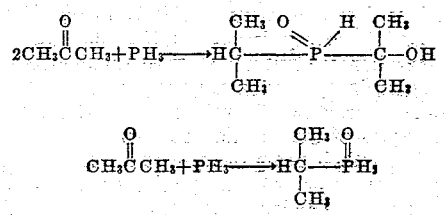

This reaction is conducted in the same fashion as that described in Example I, above, with the exception that the reaction mixture formed is neutralized, etc., as indicated below. A solution of 29 grams (0.50 mole) of acetone in 125 milliliters of concentrated (37 percent HCl by weight) hydrochloric acid is reacted with phosphine for 2 hours. The resulting reaction mixture is then carefully neutralized with aqueous sodium hydroxide in a nitrogen atmosphere and the resulting solution extracted several times with methylene chloride. The extracts are combined, dried over sodium sulfate and the methylene chloride removed by evaporation. The resulting residual solid is recrystallized from hexane to give 7.5 grams (which is 20 percent by weight of the amount theoretically producible) of isopropyl-2-hydroxyisopropylphosphine oxide, melting point 66° C.–68° C. Further recrystallization gives a sample having a melting point of 71° C.–72° C.

Analysis calculated for $C_6H_{15}O_2P$: C, 47.99; H, 10.07; P, 20.63. Found: C, 47.73; H, 9.78; P, 20.19.

The neutralized aqueous solution remaining after extraction with methylene chloride is evaporated to remove water at 20° C. and 1 millimeter pressure (mercury). The residue is extracted with alcohol and the alcohol, in turn, evaporated to give isopropylphosphine oxide as a colorless liquid.

EXAMPLE III

*Cyclopentyl-1-hydroxycyclopentylphosphine oxide and cyclopentylphosphine oxide*

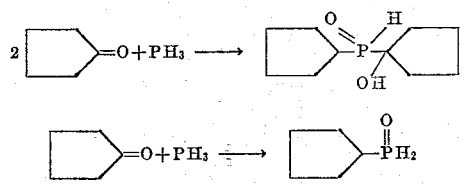

This reaction is conducted in the manner described in Example II, above, using 33.6 grams (0.4 mole) of cyclopentanone in 110 milliliters of concentrated (37 percent by weight) HCl. After the resulting reaction mixture is neutralized, 10.0 grams (which is 25 percent by weight based on the amount theoretically producible) of cyclopentyl-1-hydroxycyclopentylphosphine oxide is obtained, melting point 147° C.–148° C.

Analysis calculated for $C_{10}H_{19}O_2P$: C, 59.39; H, 9.46; P, 15.31. Found: C, 59.22; H, 9.46; P, 15.13.

Cyclopentylphosphine oxide is recovered from the aqueous filtrate in the manner described in Example II, above.

EXAMPLE IV

*1-ethylpropylphosphine oxide and 1-ethylpropyl-1-hydroxy-1-ethylpropylphosphine oxide*

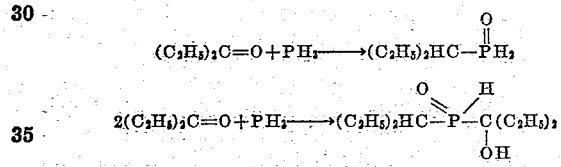

A solution of 43 grams (0.5 mole) of 3-pentanone in 125 milliliters of concentrated (37 percent HCl by weight) hydrochloric acid is reacted with phosphine for 5 hours in the manner described in Example II, above. The reaction mixture is neutralized and extracted with methylene chloride, also as in Example II. The methylene chloride is then removed by evaporation to give a liquid mixture of 1-ethylpropylphosphine oxide and 1-ethylpropyl-1-hydroxy-1-ethylpropylphosphine oxide in which the former predominates. This mixture is dissolved in petroleum ether and cooled to −70° C., whereupon the primary oxide crystallizes. The resulting slurry is filtered to separate the predominant component, the primary oxide solids. The filtrate is then evaporated to give the secondary phosphine oxide in solid form.

EXAMPLE V

*1-propylbutylphosphine oxide and 1-propylbutyl-1-hydroxy-1-propylbutylphosphine oxide*

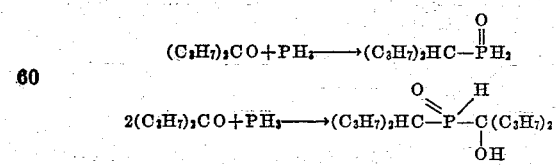

A solution of 34.2 grams of 4-heptanone (0.3 mole) in 110 milliliters of concentrated (37 percent HCl by weight) hydrochloric acid is reacted with phosphine for 11 hours in the manner described in Example II, above. After neutralization, extraction, and evaporation as in Example II, a liquid product mixture is obtained consisting of 1-propylbutylphosphine oxide and 1-propylbutyl-1-hydroxy-1-propylbutylphosphine oxide in which the former predominates. Treatment of this mixture with ether as in Example IV, above, effects separation of the product components.

EXAMPLE VI

*α-Methylbenzylphosphine oxide and α-methylbenzyl-1-hydroxy-α-methylbenzylphosphine oxide*

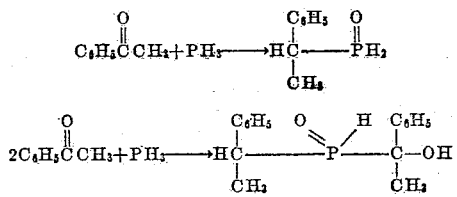

A solution of 48.1 grams (0.4 mole) of acetophenone in 120 milliliters of concentrated (37 percent HCl by weight) hydrochloric acid is reacted with phosphine for 1.5 hours in the manner described in Example I, above. The resulting product mixture is diluted with water to give a precipitate of α-methylbenzyl-1-hydroxy-α-methylbenzylphosphine oxide, melting point 124° C.–126° C.

Analysis calculated for $C_{16}H_{19}O_2P$: C, 70.02; H, 6.98; P, 11.29. Found: C, 70.20; H, 7.28; P, 11.46.

The aqueous filtrate contains α-methylbenzylphosphine oxide which is removed therefrom in the manner described in Example II, above.

While the above are just a few examples demonstrating the scope of the instant discovery, the process described in these examples is applicable to the ketone reactants listed above. The corresponding primary and secondary oxides are recovered:

Benzhydryl-α-hydroxybenzhydrylphosphine oxide
Benzhydrylphosphine oxide
(α-Methyl-p-chlorobenzyl)-α-hydroxy-α-methyl-p-chlorobenzylphosphine oxide
α-Methyl-p-chlorobenzylphosphine oxide
(3 - carboxy - 1 - methylpropyl - 1 - hydroxy - 3 - carboxy - 3 - methylpropylphosphine oxide
3-carboxy-1-methylpropylphosphine oxide
1,2 - dimethylpropyl - 1 - hydroxy - 1,2 - dimethylpropylphosphine oxide
1,2-dimethylpropylphosphine oxide
1 - ethylnonyl - 1 - hydroxy - 1 - ethylnonylphosphine oxide
1-ethylnonylphosphine oxide
3 - hydroxy - 1 - methylpropyl - 1,3 - dihydroxy - 1 - methylpropylphosphine oxide
3 - hydroxy - 1 - methylpropylphosphine oxide
(3 - methoxy - 1 - methylpropyl) - 3 - methoxy - 1 - hydroxy - 1 - methylpropylphosphine oxide
3-methoxy-1-methylpropylphosphine oxide
(α - Methyl - p - nitrobenzyl) - α - hydroxy - α - methyl-p - nitrobenzylphosphine oxide
α - Methyl-p-nitrobenzylphosphine oxide Very suitable concentrations of acid which may be employed in the instant discovery are in the range of 1 part by weight of aqueous acid solution up to about 25 parts by weight relative to the weight of ketone.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. As a new compound an organophosphorus oxide characterized by the formula

wherein R is selected from the radicals consisting of alkyl, substituted and unsubstituted, cycloalkyl, substituted and unsubstituted, and aralkyl, substituted and unsubstituted, and R' is selected from the radicals consisting of 1-hydroxyalkyl, substituted and unsubstituted, 1-hydroxycycloalkyl, substituted and unsubstituted, and α-hydroxyaralkyl, substituted and unsubstituted, said substituents for R and R' being selected from the group consisting of halo-, carboxy-, alkoxy-, nitro-, and hydroxyl-.

2. As a new compound, cyclohexyl-1-hydroxycyclohexyl phosphine oxide.

3. As a new compound, 1-ethylpropyl-1-hydroxy-1-ethylpropylphosphine oxide.

4. As a new compound, isopropyl-2-hydroxyisopropyl phosphine oxide.

5. As a new compound, 1-propylbutyl-1-hydroxy-1-propylbutylphosphine oxide.

6. As a new compound, 1-methylbenzyl-1-hydroxy-α-methylbenzylphosphine oxide.

7. A method of preparing or organophosphorus oxides corresponding to the formula

wherein R is selected from the radicals consisting of alkyl, substituted and unsubstituted, cycloalkyl, substituted and unsubstituted, and aralkyl, substituted and unsubstituted, and R' is selected from the group consisting of hydrogen, 1-hydroxyalkyl, substituted and unsubstituted, 1-hydroxycycloalkyl, substituted and unsubstituted, and α-hydroxyaralkyl, substituted and unsubstituted, said substituents for R and R' being selected from the group consisting of halo-, carboxy-, alkoxy-, nitro-, and hydroxyl-, which comprises bringing together into intimate contact phosphine and at least one molar equivalent of a member selected from the group consisting of alkyl ketones, substituted and unsubstituted, cycloalkyl ketones, substituted and unsubstituted, and aralkyl ketones, substituted and unsubstituted, said substituents corresponding to the substituents for R and R' given above, in the presence of a mineral acid and recovering the resulting corresponding organic phosphine oxide defined in the above formula.

8. The process of claim 7 wherein the ketone is cyclohexanone.

9. The process of claim 7 wherein the ketone is 3-pentanone.

10. The process of claim 7 wherein the ketone is acetone.

11. The process of claim 7 wherein the acetone is 4-heptanone.

12. The process of claim 7 wherein the ketone is acetophenone.

13. A method of preparing organophosphorus oxides corresponding to the formula

wherein R is selected from the radicals consisting of alkyl, substituted and unsubstituted, cycloalkyl, substituted and unsubstituted, and aralkyl, substituted and unsubstituted, and R' is selected from the group consisting of hydrogen, 1-hydroxyalkyl, substituted and unsubstituted, 1-hydroxycycloalkyl, substituted and unsubstituted, and α-hydroxyaralkyl, substituted and unsubstituted, said substituents for R and R' being selected from the group consisting of halo-, carboxy-, alkoxy-, nitro-, and hydroxyl- which comprises bringing together into intimate contact and in equimolar proportions phosphine and a member selected from the group consisting of alkyl ketones, substituted and unsubstituted, cycloalkyl ketones, substituted and unsubstituted, and aralkyl ketones, substituted and unsubstituted, said substituents corresponding to the substituents for R and R' given above, in the presence of a mineral acid and recovering the resulting corresponding primary organic phosphine oxide defined in the above formula.

14. A method of preparing organophosphorus oxides corresponding to the formula $$R\underset{H}{\overset{\overset{O}{\|}}{P}}R'$$

wherein R is selected from the radicals consisting of alkyl, substituted and unsubstituted, cycloalkyl, substituted and unsubstituted, and aralkyl, substituted and unsubstituted, and R' is selected from the group consisting of 1-hydroxyalkyl, substituted and unsubstituted, 1-hydroxycycloalkyl, substituted and unsubstituted, and α-hydroxyaralkyl, substituted and unsubstituted, said substituents for R and R' being selected from the group consisting of halo-, carboxy-, alkoxy-, nitro-, and hydroxyl-, which comprises bringing together into intimate contact phosphine and a member selected from the group consisting of alkyl ketones, substituted and unsubstituted, cycloalkyl ketones, substituted and unsubstituted, and aralkyl ketones, substituted and unsubstituted, said substituents corresponding to the substituents for R and R' given above, in the presence of a mineral acid, said reactants being present in at least a 2:1 molar ratio, ketone to phosphine, and recovering the resulting corresponding secondary organic phosphine oxide defined in the above formula.

No references cited.

UNITED STATES PATENT OFFICE
CERTIFICATE OF CORRECTION

Patent No. 3,005,029                          October 17, 1961

Sheldon A. Buckler et al.

It is hereby certified that error appears in the above numbered patent requiring correction and that the said Letters Patent should read as corrected below.

Column 2, line 55, in the title of EXAMPLE I, for "Cyclohexy-1-hydroxycyclohexylphosphine", in italics, read -- Cyclohexyl-1-hydroxycyclohexylphosphine --, in italics; column 5, line 35, for "(3-carboxy-1-methylpropyl-1-" read -- (3-carboxy-1-methylpropyl)-1- --; column 6, line 47, for "acetone" read -- ketone --.

Signed and sealed this 1st day of May 1962.

(SEAL)
Attest:

ERNEST W. SWIDER
Attesting Officer

DAVID L. LADD
Commissioner of Patents